United States Patent [19]
Miers et al.

[11] 3,940,177
[45] Feb. 24, 1976

[54] VIBRATION-ISOLATED CAB FOR TRACTORS

[75] Inventors: Bruce W. Miers, Peoria Heights; Arthur E. Olt, Jr., Pekin; Richard Van Rossem, Canton; John D. Wait, Jr., Dunlap, all of Ill.

[73] Assignee: Caterpillar Tractor Co., Peoria, Ill.

[22] Filed: Aug. 8, 1974

[21] Appl. No.: 495,590

[52] U.S. Cl............ 296/35 R; 180/89 A; 296/28 C
[51] Int. Cl.².......................................... B62D 23/00
[58] Field of Search ...... 216/35 R, 35 B, 102, 28 C; 280/150 C; 180/89 A

[56] References Cited
UNITED STATES PATENTS

| | | | |
|---|---|---|---|
| 3,036,858 | 5/1962 | Fingerut.................. | 280/150 C X |
| 3,336,074 | 8/1967 | Baines et al.............. | 280/150 C |
| 3,508,784 | 4/1970 | Small....................... | 296/35 R |
| 3,527,474 | 9/1970 | Boersma.................. | 296/102 X |
| 3,560,019 | 2/1971 | Moore...................... | 296/102 X |
| 3,572,819 | 3/1971 | Moore...................... | 296/102 |
| 3,623,754 | 11/1971 | Moore...................... | 296/102 X |
| 3,633,934 | 1/1972 | Wilfert..................... | 296/35 B |
| 3,667,566 | 5/1970 | Hopkins................... | 180/89 A |
| 3,679,256 | 7/1972 | Orns........................ | 296/102 |

*Primary Examiner*—Robert J. Spar
*Assistant Examiner*—Donald W. Underwood
*Attorney, Agent, or Firm*—Phillips, Moore, Weissenberger Lempio & Strabala

[57] ABSTRACT

An operator's cab is mounted on the frame of a track-type tractor by mounting means comprising first and second pairs of upstanding posts. A first vibration damping means connects a lower end of each of the first pair of posts to the frame for isolating the posts against vibrations and for permitting the posts to pivot rearwardly upon release of a second vibration damping means, releasably connecting a lower end of each of the second pair of posts to the frame.

3 Claims, 3 Drawing Figures

VIBRATION-ISOLATED CAB FOR TRACTORS

BACKGROUND OF THE INVENTION

The operator's cab for an earthworking vehicle, such as a track-type tractor, is normally mounted on a frame of the vehicle by a plurality of supporting posts. The posts provide roll-over protection for the operator and are oftentimes attached to the frame by resilient bushing assemblies or the like for substantially isolating the operator's cab against vibrations occurring during vehicle operation. Typical mountings of this type are disclosed in U.S. Pat. Nos. 3,036,858; 3,203,728; 3,572,819; and 3,623,754.

SUMMARY OF THIS INVENTION

An object of this invention is to provide an improved mounting means for mounting an operator's cab on the frame of an earthworking vehicle for isolating the cab against such vibrations and for permitting the cab to be pivoted to an open position to expose vehicle components located thereunder for servicing purposes. The mounting means comprises first post means interconnected between a back side of the cab and the frame and connected to the frame by first vibration damping means which further function to permit the cab to be pivoted rearwardly thereon. The mounting means further comprises second post means disposed forwardly on the vehicle and interconnected between the cab and the frame by second vibration damping means which further provide stability of the cab in all directions.

BRIEF DESCRIPTION OF THE DRAWINGS

Further objects of this invention will become apparent from the following description and accompanying drawings wherein.

DETAILED DESCRIPTION

Figure 1:
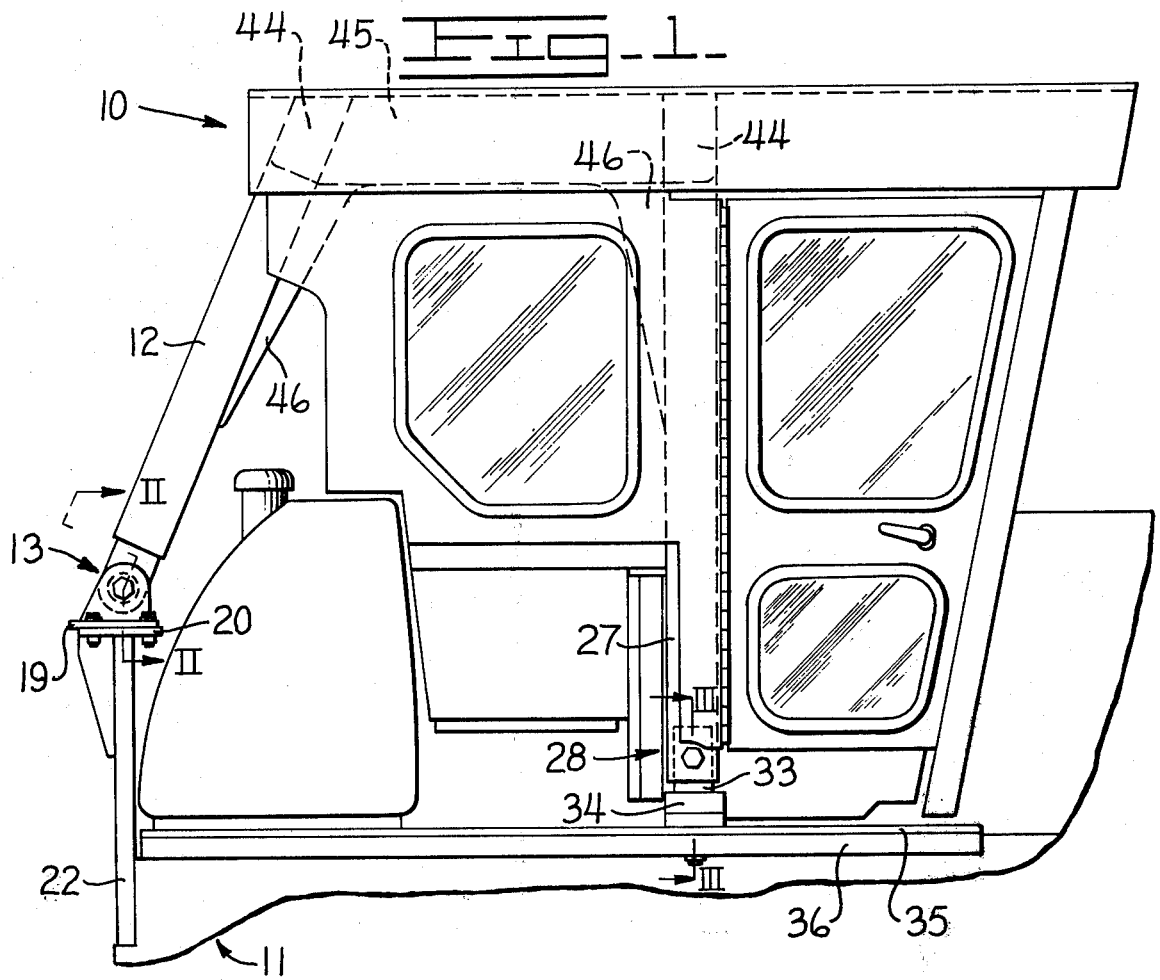
FIG. 1 is a side elevational view of an operator's cab mounted on the frame of a tractor.
Figure 2:
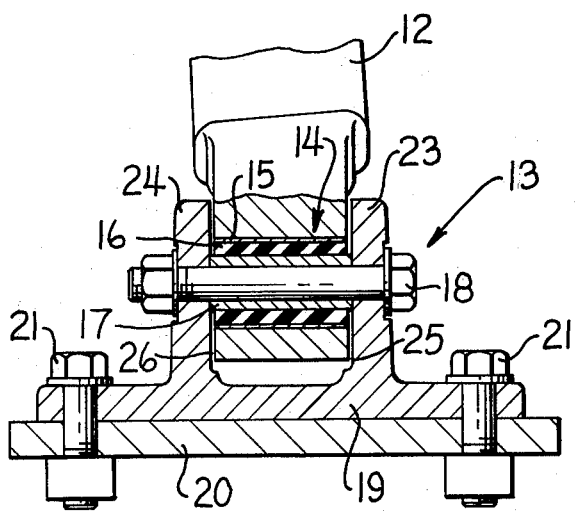
FIG. 2 is an enlarged sectional view, taken in the direction of arrows II—II in FIG. 1, illustrating a first vibration damping means for mounting a first support post on such frame.

FIG. 1 partially illustrates a track-type tractor comprising an operator's protective structure or cab 10 disposed on a frame 11 thereof. Mounting means for mounting the cab on the frame comprises first post means, preferably constituting a pair of laterally spaced posts 12 suitably secured at their upper ends to a back side of the cab by welds or the like. The lower end of each post is connected to the frame by a first vibration damping means 13, illustrated in detail in FIG. 2.

The vibration damping means is adapted to at least substantially prevent the transmission of vibratory energy, generated during vehicle operation, to the posts and thus to the cab. In addition, such means will permit the posts and cab to pivot rearwardly about an axis, disposed transversely relative to the longitudinal axis of the vehicle, as will be hereinafter more fully described. The vibration damping means preferably comprises a resilient bushing assembly 14 mounted as a removable cartridge in a bore formed transversely through a lower end of each post 12.

The bushing assembly comprises a cylindrical outer metallic sleeve 15, an annular elastomeric (e.g., rubber) bushing 16 and a cylindrical inner metallic bearing bushing 17 mounted on the shank of a bolt 18. The bolt releasably connects the lower end of the post to a bifurcated bracket 19, attached to a plate 20 by a plurality of bolts 21. Referring to FIG. 1, plate 20 is secured to an upstanding support member 22 which forms an integral part of frame 11. of bolts 21.

Referring once again to FIG. 2, bracket 19 comprises a pair of upstanding support legs 23 and 24 which are separated by a lateral distance substantially equal to the axial length of bearing bushing 17. In its assembled position, bolt 18 preferably functions to clamp the bearing bushing between slightly resilient support legs 23 and 24 to prevent rotation thereof. In addition, the distance between the lateral sides of the lower end of the post and the axial lengths of sleeve 15 and bushing 16 are slightly less than the lateral distance between legs 23 and 24 to provide clearances 25 and 26 therebetween for permitting a slight but universal movement of bracket 19 relative to post 12.

Figure 3:
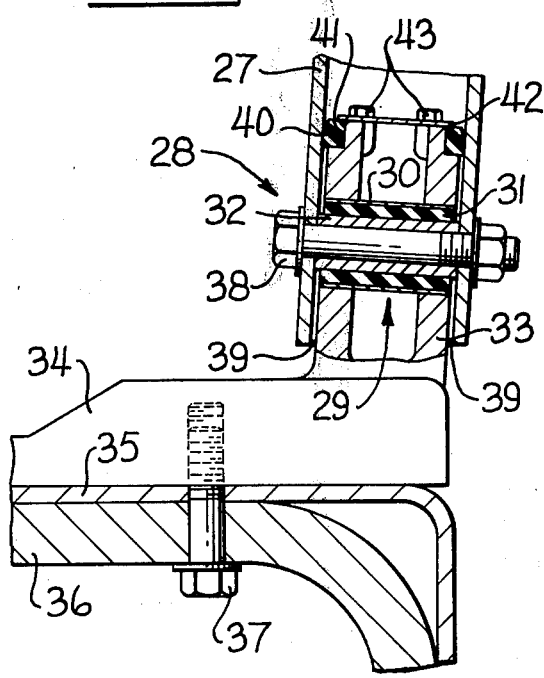
FIG.3 is an enlarged sectional view, taken in the direction of arrows III—III in FIG. 1, illustrating a second vibration damping means for mounting a second support post on such frame.

Referring to FIG. 1, a second post means preferably constitutes a pair of laterally spaced second posts 27 (one shown) disposed on either side of the cab and forwardly on the vehicle relative to first posts 12. The cab is thus solely supported on frame 11 by mounting means comprising the four posts 12 and 27. FIG. 3 discloses the details of a second vibration damping means 28 for connecting a lower end of each of the second posts to frame 11 for substantially isolating the posts and cab against vibrations generated during vehicle operation.

Such second vibration damping means comprises a resilient bushing assembly 29, similar to bushing assembly 14. In particular, bushing assembly 29 comprises a cylindrical metallic outer sleeve 30, an annular elastomeric bushing 31 and a cylindrical inner metallic bearing bushing 32. The lower end of post 27 is tubular and is telescopically mounted on an upstanding support member 33 having a bore formed transversely therethrough to retain bushing assembly 29 therein.

The support member is integral with a base member 34, releasably attached to a fender 35 and to a bracket 36 forming an integral part of frame 11, by a plurality of bolts 37 (one shown). The lower end of the post is releasably attached to support member 33 by a bolt 38 having bushing assembly 29 mounted thereon. The lower end of the post is spaced slightly from support member 33 to define a clearance 39 completely therearound. The post and support member each preferably comprise a square cross section.

A continuous elastomeric (e.g., rubber) ring 40 is mounted in a recess 41 formed around the upper end of support member 33 and is compressed against the abutting inner wall portions of post 27. A retainer plate 42 is releasably attached to the upper end of the support member by cap screws 43 to retain ring 40 in position. It is thus apparent that second vibration damping means 28 will permit slight universal movement, as between each post 27 and a respective support member 33, to substantially isolate the posts and cab from the transmission of vibrations thereto from frame 11.

The cab is reinforced for rollover protection by interconnecting post 12 and 27 by structural members 44 and 45 extending laterally and longitudinally between the upper ends of the post. This structure is further reinforced by gussets 46.

When it is desired to service vehicle components (not shown) mounted beneath cab 10, a workman need only remove bolts 37, loosen bolts 18 and pivot the cab rearwardly about the aligned longitudinal axes of bolts 18. Base member 34 of the second vibration damping means will also pivot rearwardly with the cab. A slight release of bolts 18 (e.g., 1½ turns) is necessary to release the clamping pressures applied by upstanding legs 23 and 24 against the respective ends of bearing bushing 17 to permit the bearing bushing to pivot on bolt 18.

The telescopically mounted post 27 on support 23 allows the front damping means 28 to resist longitudinal and lateral forces on the cab. When this occurs physical contact is made between post 27 and support 23 transmitting the force directly into the frame resisting a tendency of the post to pivot thus stabilizing the cab.

The rear damping means 13 will not resist a tendency to pivot about bolt 18 resulting from a longitudinal force due to the orientation of its lateral pivot axis. A lateral force on the cab, however, is resisted by contact of the post 12 contacting upstanding legs 23 and 24 of brackets 19. With this type of arrangement the second mounting means resists a percentage of the forces on the cab. Thus the cab frame requires less bracing keeping the size of gussets 46 to a minimum.

We claim:

1. An earthworking vehicle disposed for movement along a longitudinal axis thereof comprising a frame, an operator's protective cab disposed on said frame, and mounting means mounting said cab on said frame, said mounting means comprising a pair of laterally spaced first posts inter-connected between a back side of said cab and said frame, first vibration damping means comprising a resilient bushing assembly mounted in a transverse bore formed through a lower end of each of said posts, said bushing assembly including a cylindrical bearing bushing rotatably mounted on the shank of a bolt means releasably attached between a pair of upstanding support legs secured to said frame, an annular elastomeric bushing mounted on said bearing and a cylindrical sleeve mounted on said elastomeric bushing and in said bore, the bearing bushing having an axial length substantially equal to the lateral distance between inner surface portions of said support legs and being clamped axially therebetween by said bolt means, a pair of laterally spaced second posts disposed forwardly on said vehicle relative to said first posts, the lower ends of said second posts being tubular and telescopically mounted on upstanding support members releasably secured to said frame, second vibration damping means comprising the said first resilient bushing assembly mounted in a transverse bore through said upstanding support member, said bolt means securing the tubular posts to the support members whereby said posts are isolated from vibrations in said frame during operation of said vehicle and by completely releasing said upstanding support member and partially releasing said first bolt means, said frame and cab may be pivoted backwards.

2. The vehicle of claim 1 wherein the width of the lower end of said posts and the axial lengths of said elastomeric bushing and said cylindrical sleeve are each slightly less than the lateral distance between the inner surface portions of said support legs and are positioned relative thereto to provide a slight clearance between the inner surface portions of each support leg and a respective side of the lower end of said posts and respective ends of said elastomeric bushing and said cylindrical sleeve.

3. The vehicle of claim 1 further comprising an elastomeric ring mounted on an upper end of said support members and compressed between inner surface portions of the lower end of said posts and said support members.

* * * * *